United States Patent [19]
Fortunato

[11] 3,949,880
[45] Apr. 13, 1976

[54] SHELF EXTENDER

[75] Inventor: Vincent Fortunato, Valley Stream, N.Y.

[73] Assignee: Henschel-Steinau, Inc., Englewood, N.J.

[22] Filed: Feb. 20, 1975

[21] Appl. No.: 551,368

[52] U.S. Cl. .................... 211/86; 151/20; 211/126; 211/148; 248/226 A; 248/410; 269/167; 269/172

[51] Int. Cl.² .. A47F 5/00; F16B 39/16; B25B 1/12; B25B 5/10

[58] Field of Search ....... 211/86, 88, 126, 134, 148; 108/26; 248/226 A, 410; 85/32 V, 33; 269/172, 181, 249, 166, 169, 170, 171, 179, 180, 167, 168; 151/20

[56] References Cited
UNITED STATES PATENTS

| | | | |
|---|---|---|---|
| 809,882 | 1/1906 | Wrigley | 269/249 X |
| 900,796 | 10/1908 | Tambling | 53/112 |
| 1,125,911 | 1/1915 | Periolat | 269/179 X |
| 1,804,007 | 5/1931 | Golnick | 269/249 X |
| 2,312,955 | 3/1943 | Camburn | 269/249 X |
| 2,326,261 | 8/1943 | Shippee et al. | 151/20 |
| 2,469,600 | 5/1949 | Jordan | 269/180 |
| 2,947,333 | 8/1960 | Johnson | 269/249 X |
| 3,147,003 | 9/1964 | Johnson | 269/249 X |
| 3,219,336 | 11/1965 | Merriman | 269/249 X |
| 3,289,615 | 12/1966 | Marschak | 211/134 X |
| 3,647,078 | 3/1972 | Fortunato | 211/134 |
| 3,744,645 | 7/1973 | Hochman | 248/226 A X |

FOREIGN PATENTS OR APPLICATIONS 569,359  5/1945  United Kingdom................. 85/32 V Primary Examiner—Roy D. Frazier
Assistant Examiner—Thomas J. Holko
Attorney, Agent, or Firm—Samuelson & Jacob

[57] ABSTRACT

A shelf extender for presenting a product to the purchaser forward of a shelf having a container for holding and displaying the product, the container, in one embodiment, having a rear wall with receiving means to cooperate with a plate of a clamp, the clamp having a pair of spaced arms cantilevered therefrom, the first arm having a fixed clamping surface at the end thereof, the second arm having a cavity having two plates adjacent the free end thereof, a standard size nut in the cavity, an opening in each plate of the cavity, the openings being in general alignment with the nut so that a bolt may pass therethrough, a standard size bolt of another size such that the outside diameter of the bolt is no larger than the inside diameter of the nut, the plates of the cavity being shaped so that the nut is in a first position against one plate and in a second position against the other plate, in the first position of the nut, the nut is normal to the bolt and in the second position of the nut, the nut is canted with respect to the bolt so that at least a portion of the thread of the bolt engages at least a portion of the thread of the nut in threaded engagement whereby in the first position of the nut, the bolt is movable for coarse adjustment and in the second position of the nut, the bolt is movable for fine adjustment, a clamping surface at the end of the bolt to permit the clamp to rigidly engage the shelf and thereby hold the shelf extender firmly in place.

In another embodiment, the clamp is a part of the end piece of the shelf extender and there are two such end clamps utilized to support the shelf extender. A quick release mechanism for the clamp may be provided to facilitate application of the shelf extender to a shelf and its removal therefrom.

24 Claims, 11 Drawing Figures

SHELF EXTENDER

The invention relates to shelf extenders and in particular to those shelf extenders which may be clamped to a regular store shelf so as to contain the product and project it forward toward potential customers. The invention is also directed toward providing clamps for use with the shelf extenders. The clamps use a conventional nut of standard size and configuration and having a standard unmodified conventional helical internal thread and a conventional bolt of standard size and configuration and having a standard unmodified conventional helical external thread of another size. For the purpose of this application such a nut and such a bolt have been designated as "a standard size nut" and "a standard size bolt," respectively. The sizes being such that when the nut is normal to the bolt, the bolt passes therethrough and when the nut is canted with respect to the bolt, at least a portion of the thread of the bolt engages at least a portion of the thread of the nut in threaded engagement.

Most prior art shelf extenders are made with the clamping means integral with the product containing means. Other shelf extenders have clamps which are insertable into receiving means in the product container. However, these insertable clamps utilize special parts and must be specially fabricated. There is a need for a clamp for shelf extenders in which the movable portion of the clamp is made of standard readily available hardware to thereby permit easy replacement in the event they are lost or removed. As a result, it is evident that considerable savings will be obtained from the use of such clamps in shelf extenders. These savings are beneficial to the manufacturer of the product being displayed, the store and the purchasing public.

Broadly, the invention is directed toward providing clamps which may be received in receiving means such as a pocket or groove in the rear wall of the product bin. The product bin may be of any length and as many clamps as are necessary to support the bin are inserted in the receiving means in the rear wall. The clamp is in the general shape of a C, having a spine and two spaced apart cantilevered arms. The spine is shaped to cooperate with the receiving means and one of the cantilevered arms has a clamping surface or pad adjacent one end thereof. The other cantilevered arm has a cavity adjacent the end thereof. The upper and lower surfaces of the cavity have openings therein and the cavity is sized to receive a standard size nut. The openings in the cavity's upper and lower surfaces and in the nut are aligned to permit a bolt to pass therethrough.

A bolt of another size whose outside diameter is no larger than the inside diameter of the nut is inserted through the three openings. The cavity's surfaces are shaped so that the nut is movable between a first position in which the nut is normal to the bolt and a second position in which the nut is canted with respect to the bolt. In the first position of the nut, the bolt moves freely through the nut to permit the making of a coarse adjustment of the clamp. In the second position of the nut, at least a portion of the thread of the bolt engages at least a portion of the thread of the nut in threaded engagement to permit the making of a fine adjustment of the clamp.

It is an important object of the invention to provide a shelf extender for containing product and for attachment to a shelf to project the product forward of the shelf wherein the clamps and the product containers may be fabricated separately.

It is a further object of the invention to provide a clamp which may be used with a variety of shelf extenders and other workpieces.

It is another object of the invention to provide a shelf extender wherein there are two clamps, each of which is integral with one end of the shelf extender.

These and other objects, advantages, features and uses will be apparent during the course of the following description when taken in conjunction with the accompanying drawing wherein.

Figure 3:
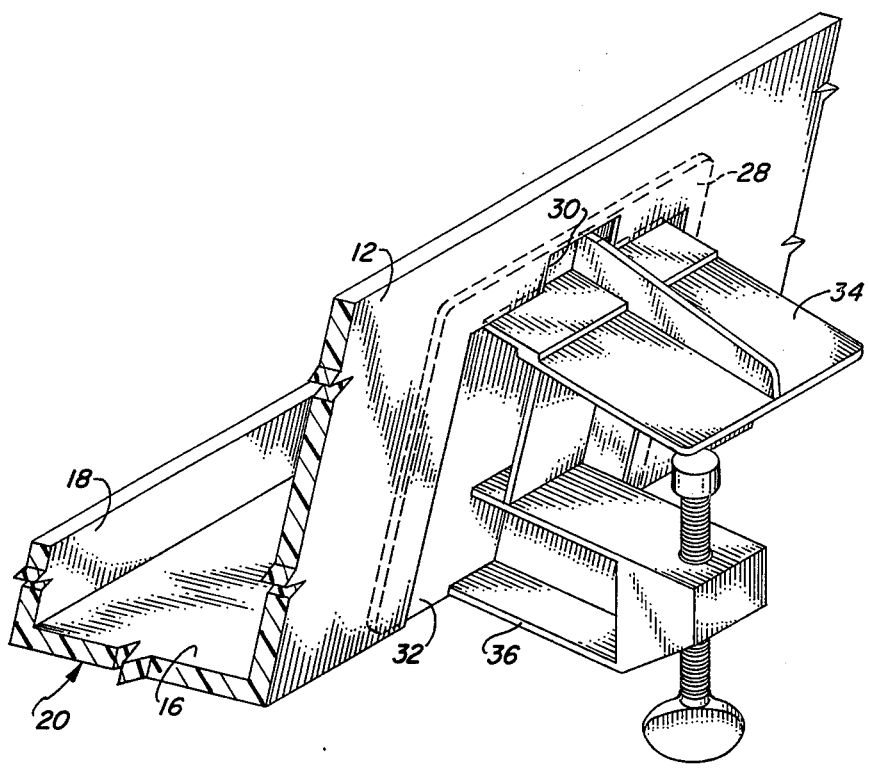
FIG. 3 is an isometric view of the rear of a portion of the embodiment of FIG. 1.
Figure 6:
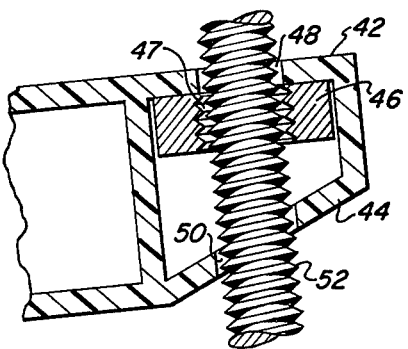
Figure 7:
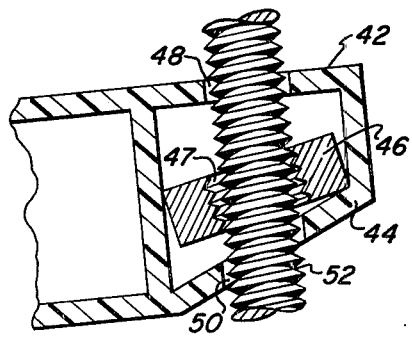
Figure 4:
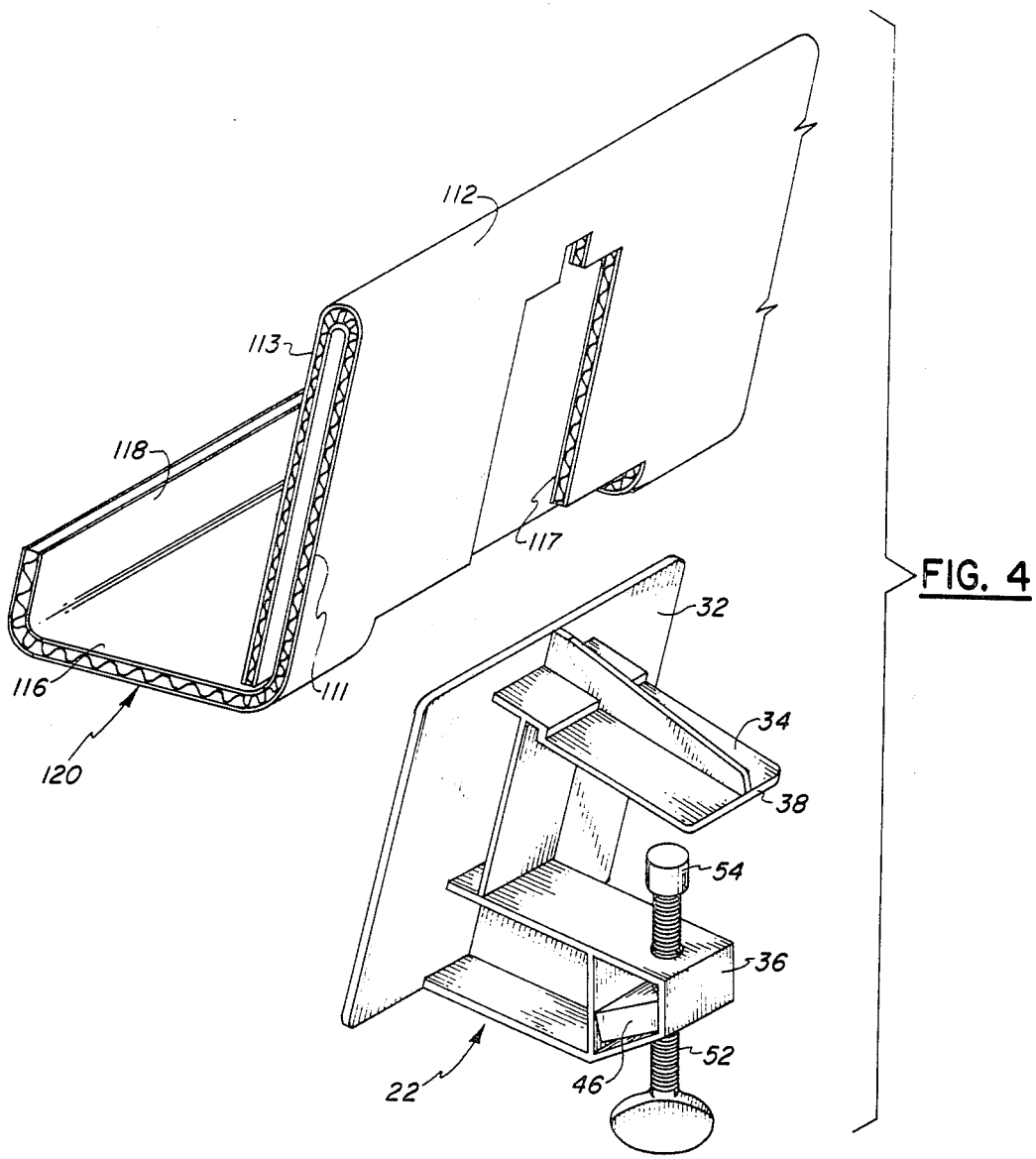
FIG. 4 is an exploded isometric view of the rear of a further embodiment of the invention.
Figure 9:
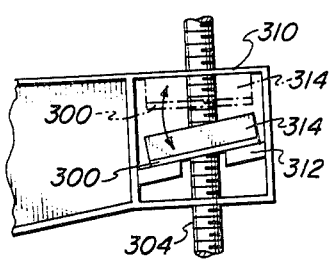
Figure 10:
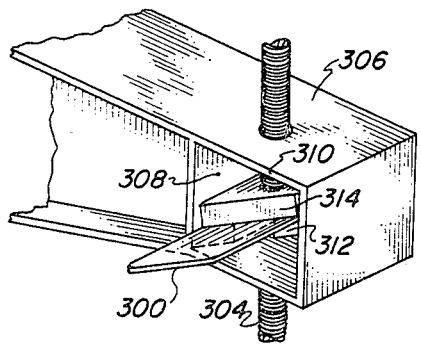
Figure 5:
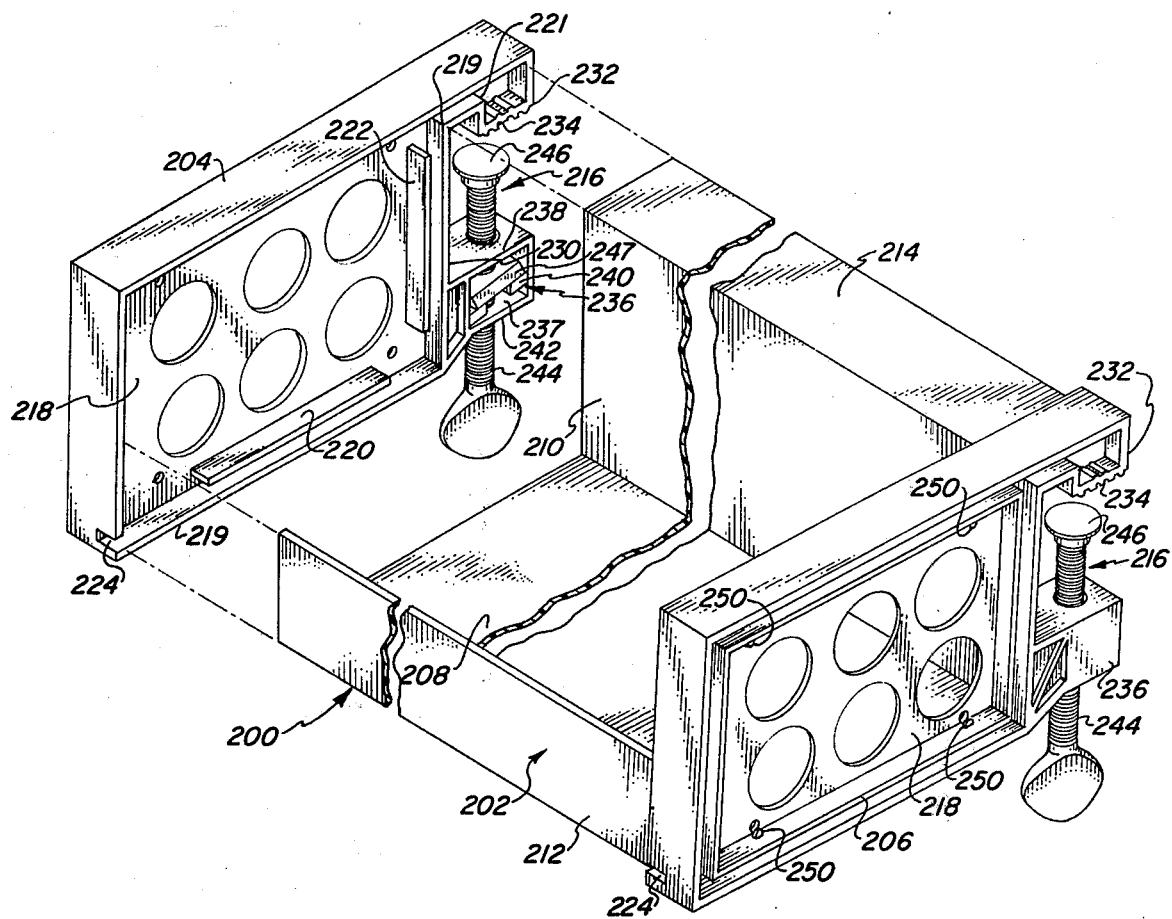
FIG. 5 is an exploded isometric view of a still further embodiment of the invention.
Figure 8:
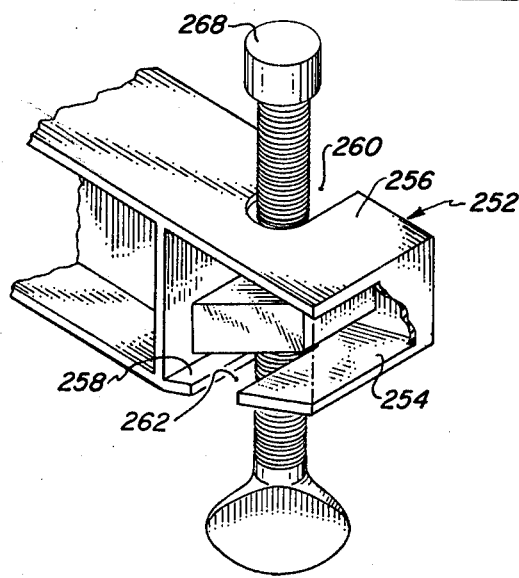

FIGS. 6 and 7, on the same sheet as FIG. 3, are detail views showing the operative positions of the movable member of the clamp of the invention;

FIG. 8, on the same sheet as FIG. 5 is a perspective view of a further embodiment of the clamp of the invention;

FIG. 9, on the same sheet as FIG. 4 is an elevational view of the lower portion of a clamp of the invention with a quick release member for facilitating release of the clamp;

FIG. 10 is an isometric view of the lower portion of the clamp of FIG. 9; and

Figure 11:
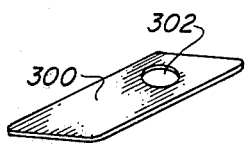

FIG. 11 is an isometric view of the quick release member used in the embodiment of FIGS. 9 and 10.

Figure 1:
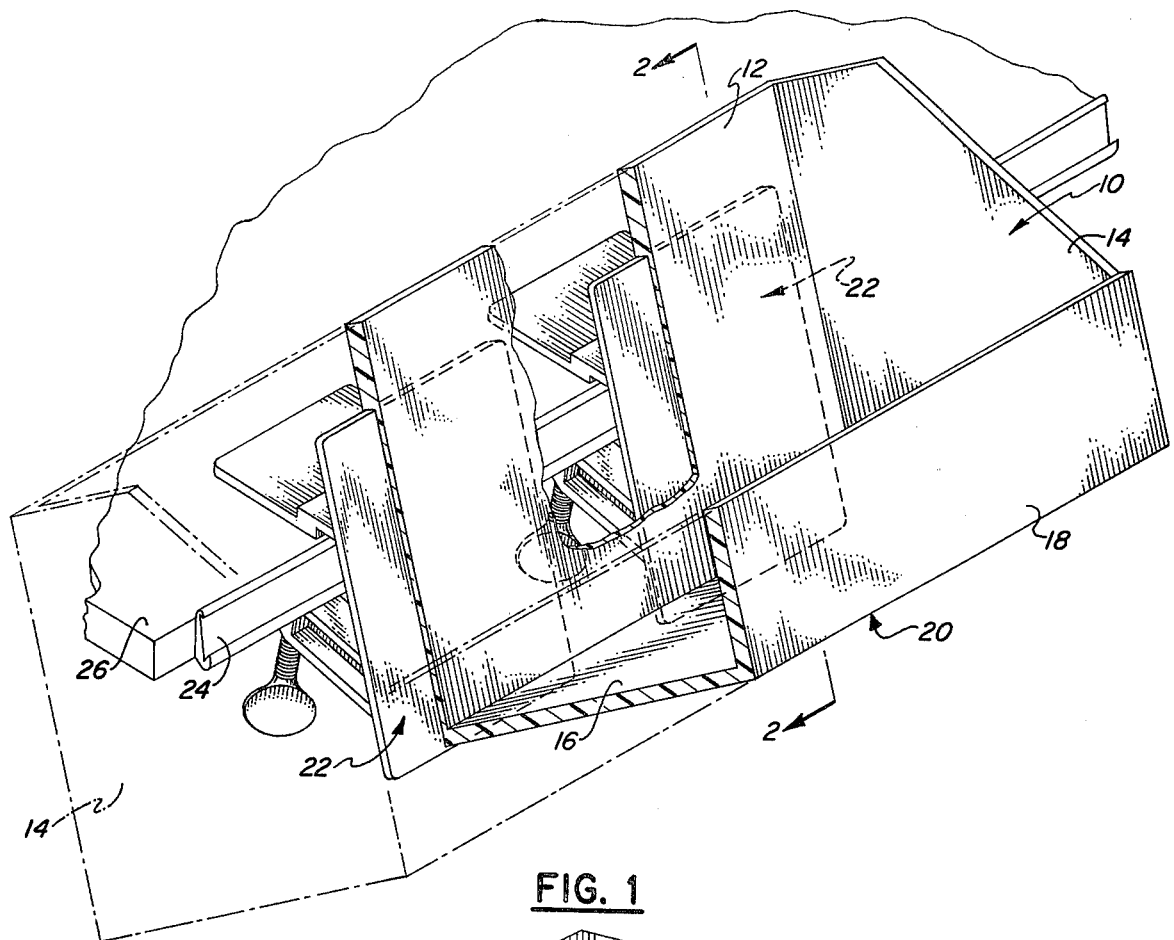
FIG. 1 is an isometric view, partly broken away, of an embodiment of the invention.

In the drawing, wherein, for the purpose of illustration, there are shown various embodiments of the invention and wherein like numerals designate like parts throughout the same, the numeral 10 designates a shelf extender of the invention, generally. Shelf extender 10 (FIG. 1) comprises a rear wall 12, end walls 14, a floor 16 and a front ledge 18 which in combination provide means for supporting product to be displayed 20. One or more clamps 22 are used to clamp the product supporting means (shown as a bin) 20 to a shelf 26. The price channel on the shelf is designated as 24.

Figure 2:
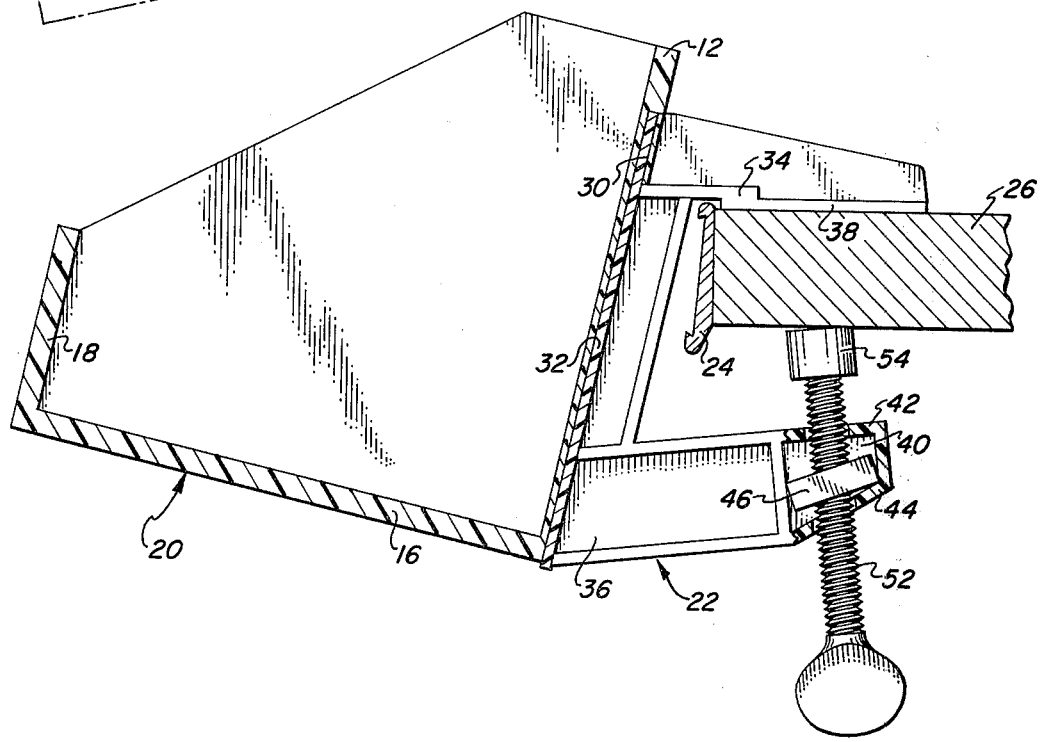
FIG. 2 is a sectional view, taken on lines 2—2 of FIG. 1, viewed in the direction of the arrows.

Clamp 22 (FIGS. 2 and 3) is removably attached to the rear wall 12 of the bin 20. A lip 28 projects from the rear wall 12 to form a groove 30. Clamp 22 is provided with a spine 32 in the form of a plate which is engaged in the groove 30 as shown in FIGS. 2 and 3. Cantilevered from spine 32 is an upper arm 34 and a lower post 36, spaced from the upper arm 34. The spine 32, arm 34 and post 36 form a generally C-shaped combination. Arm 34 is provided with a clamping surface or pad 38 which engages one surface of shelf 26.

Post 36 is provided with a cavity 40 adjacent the end of the post. Cavity 40 has an upper plate 42 and a lower plate 44 and is sized to receive a nut 46 of a standard size and configuration. Nut 46 has an unmodified conventional internal helical thread of standard size. Plates 42 and 44 are provided with openings or holes 48 and 50, respectively, which are in general alignment with each other and with the hole 47 in nut 46 to permit a bolt 52 to pass therethrough. Bolt 52 has an unmodified conventional external helical thread of standard size and is provided with a clamping surface or pad 54 to engage the other surface of the shelf 26.

The shelf extender and its clamp possess advantages over most prior art shelf extenders. The first permits one to fabricate the bin and the clamps separately so that the bin may be formed of a wide variety of different materials such as plastic, corrugated paper board, metal or any other similar material. The clamp may be formed of more rigid material, sufficiently strong to support the bin. The bin and clamp may be packed separately and shipped so as to occupy a minimum volume of shipping space and may then be readily assembled at the point of use. To assemble the unit, it is only necessary to slip the plate of the clamp into the groove in the rear wall of the bin. Alternatively, the shelf extender may be shipped assembled with the product contained in the bin to facilitate immediate display of the product upon receipt by the retailer.

To facilitate rapid attachment of the shelf extender to the shelf, the clamp is provided with cavity 40. Nut 46 is movable within the cavity to a first position in which it is against plate 42 (FIG. 6) and is normal to bolt 52. Nut 46 is a standard size conventional nut and bolt 52 is a standard size conventional bolt such that its outside diameter is no larger than the inside diameter of nut 46. Thus, when nut 46 is in its first position, bolt 52 passes through it freely and permits the user to move clamping pad or surface 54 into contact with the surface of the shelf 26.

To tighten the clamp rigidly to the shelf after the coarse adjustment is made nut 46 moves due to gravity or, if necessary, is moved to a second position (FIG. 7) in which it is canted with respect to the bolt and at least a portion of the thread of the bolt engages at least a portion of the thread of the nut in threaded engagement. Then, the user can tighten the clamp fully by rotating the bolt in the usual manner.

Frequently, stores wish to use rather light weight bins formed of, for example, corrugated paper board. In such instances a pocket is formed in the rear wall of the bin to obtain the maximum possible bearing surface between the clamp plate and the rear wall. In FIG. 4, there is illustrated an exploded view of a portion of such a bin 120 and a clamp 22. Bin 120 comprises a back wall 112, a floor 116 and a front ledge 118.

Back wall 112 is formed of two thicknesses of the corrugated paper board 111 and 113. A slot and a pocket 117 are cut in thickness 111 to receive plate 32 of clamp 22. Wall elements 111 and 113 are readily spaced apart to permit plate 32 to fit into the pocket 117. It is also within the contemplation of the invention to use such pockets in bins formed of materials other than corrugated paper board. The combination is assembled by slipping plate 32 into pocket 117. The clamp is tightened to the shelf or other workpiece in the same manner as has been described previously.

In FIG. 5, there is illustrated a further embodiment of a shelf extender of the invention which has been designated generally as 200. It is seen to comprise, product holding means 202, in the form of a bin, and a pair of ends 204 and 206. Bin 202 comprises a floor 208, a back wall 210, a front ledge 212 and an upper ledge 214. Each of the ends is provided with a clamp 216, which are identical, as are the ends, except that they are mirror images, i.e., right and left. However, their construction and operation are identical. The spine of the clamp is integral with the body of the end so that the spine of the clamp is a part of the body of the end member. Body 218 of the end is preferably made as light as possible, as for example, by providing it with holes therein. A horizontal ledge 220 and a vertical ledge 222 are spaced from the raised perimeter of the body 218 to form grooves to receive the floor 208 and rear wall 210 of bin 202, respectively. Ledge 214 is received in a groove 221 which is formed above the top of the clamp, as shown in FIG. 5. A slot 224 is cut in the front portion of perimeter ledge 219 to permit the floor of the bin to pass therethrough when it is desired to use a bin which is deeper than that shown in FIG. 5.

In the embodiment illustrated, the front ledge 212 is just inside the ledges of the ends 204 and 206. Clamp 216 is seen to comprise a spine 230 which is integral with end 204 or 206, an upper cantilevered arm 232 having a clamping surface 234, and a lower cantilevered post 236 which together with the spine and arm gives the clamp a generally C-shaped form. Post 236 has a cavity 237 in the end thereof which cavity has an upper plate 238 and a lower plate 240 each having openings therein constructed as has been previously described. In addition, there is located below plate 240, a second lower plate 242 which is also provided with an opening to permit a bolt 244 to pass therethrough. Bolt 244 is provided with a clamping pad 246. Plate 240 is canted to permit a nut 247 to be moved between a first position and a second position in the same manner as has been described previously.

The outside of body 218 is provided with four small tabs 250 spaced to receive an advertising sign. The bin and the ends are preferably cemented together at the factory and the clamps are placed in the fully closed position. The product is then packed in the bin and the combination is then shipped to the store ready for attachment to a shelf. It can readily be seen that such a procedure possesses two important advantages in that the product is packed exactly as the supplier wishes it to be displayed and the retailer has to perform a minimum of work in order to display the product at the point of purchase.

In FIG. 8, there is illustrated a further embodiment of the lower portion of a clamp of the invention, the cantilevered post being designated as 252. Post 252 comprises a cavity 254 having an upper plate 256 and a lower plate 258. Upper plate 256 has an opening 260 which is in the form of a slot open at one edge of the plate. Lower plate 258 has an opening 262 which is in the form of a slot open at the edge opposite that of the open portion of opening 260. With this embodiment, it is possible to insert the full assembly of a bolt 264, a nut 266 and a clamping pad 268 into the position shown in the figure without taking the assembly apart. Since there are no sidewalls, this is done by tilting the bolt to get into one opening and then tilting it in the opposite direction to fit it into position. Thus, a user of the invention would be able to insert new assemblies into clamps of this embodiment readily.

It is often preferable to be able to release a clamp of the invention quickly. A construction of a quick release, which may be used with all the previously described clamps of the invention, is illustrated in FIGS. 9–11. A release tab 300 is formed of a flat piece of metal, plastic or other rigid material and is provided with an opening 302 to receive a bolt 304. A post 306 is cantilevered from the clamp spine in the same manner as has been previously shown and described. The post 306 has a cavity 308 with an upper plate 310 and a canted lower plate 312. Plates 310 and 312 are provided with openings which receive bolt 304 and are aligned with the opening in a nut 314. To assemble the combination, release tab 300 is inserted under nut 314 and they are placed between plate 310 and plate 312. Then bolt 304 is pushed through the openings in the nut 314, the release tab opening 302 and the openings in the plates 310 and 312.

When it is desired to make the coarse adjustment of the clamp, bolt 304 is pushed upwards which raises nut 314 to its first position, against plate 310, and allows the clamping tab on the bolt to contact the underside of the shelf. After the coarse adjustment is made, tab 300 is released, if necessary, so that it and nut 314 drop to a canted position with respect to the bolt 304 and the bolt is tightened. When the clamp is fully tightened, as, for example, upon receipt of the shelf extender with product at a store or when the shelf extender is clamped to a shelf, the clamp may be loosened quickly by loosening the bolt about one-half a turn and raising tab 300 to the upper position. In this position, the bolt is normal to the nut and the threads are disengaged thereby enabling the user to drop the bolt down quickly and thereby make the shelf extender ready for attachment to or removal from a shelf. The quick release may be used with any embodiment of clamp of the invention.

Even though particular clamp constructions have been shown with particular bins, it is within the contemplation of the invention to use the features thereof interchangeably with other embodiments of the invention.

While various embodiments of the invention have been shown and described, it is apparent to those skilled in the art that modifications are possible without departing from the spirit or scope of the invention as defined in the subjoined claims.

The embodiments of the invention in which an exclusive property or privilege is claimed are defined as follows:

1. A shelf extender for holding a product so as to display the same to the purchaser forward of a shelf having two surfaces comprising:
   a wall member having a front surface and a rear surface;
   at least one receiving means cooperative with the rear surface;
   means for supporting the product affixed to the wall member;
   a clamp comprising:
      a plate shaped to fit with the receiving means;
      an arm cantilevered from the plate having a clamping pad at the free end thereof so as to engage one surface of the shelf;
      a post cantilevered from the plate spaced from the cantilevered arm;
      the post having a cavity therein, an upper plate and a lower plate, each of said plates having an opening therein located to permit a bolt to pass therethrough;
      the lower plate being canted with respect to the upper plate;
      a conventional nut received within the cavity, the nut being of standard size and configuration and including an opening with an unmodified conventional internal helical thread of given standard size and having a given inside diameter;
      the opening in the nut being in general alignment with the openings in the cavity's plates;
      a conventional bolt of standard size and configuration including an unmodified conventional external helical thread of a standard size having an outside diameter no larger than the inside diameter of the nut opening;
      the upper and lower plates of the cavity being placed so that the nut is movable between a first position against the upper plate and a second position against the lower plate;
      in the first position, the nut is normal to the bolt and the bolt passes freely through the nut and in the second position, the nut is canted with respect to the bolt and at least a portion of the thread of the nut engages at least a portion of the thread of the bolt in threaded engagement, whereby the bolt may be moved to obtain a coarse adjustment in the first position of the nut and a fine adjustment in the second position of tne nut;
      a second clamping pad on the end of the bolt to engage the other surface of the shelf so that the means for supporting the product is projected forward of the shelf and is held in place with respect thereto.

2. The invention of claim 1 wherein:
   the receiving means comprises a lip projecting from the rear surface so as to form a groove between the lip and the rear surface; and
   the plate is shaped to engage the groove.

3. The invention of claim 2 wherein:
   there is a plurality of such clamps spaced along the rear surface of the wall member.

4. The invention of claim 3 wherein:
   the means for supporting the product comprises a floor affixed to the wall member and extending outwardly therefrom.

5. The invention of claim 2 wherein:
   the means for supporting the product comprises a floor affixed to the wall member and extending outwardly therefrom.

6. The invention of claim 1 wherein:
   there is a plurality of such clamps spaced along the rear surface of the wall member.

7. The invention of claim 6 wherein:
   the means for supporting the product comprises a floor affixed to the wall member and extending outwardly therefrom.

8. The invention of claim 1 wherein:
   the means for supporting the product comprises a floor affixed to the wall member and extending outwardly therefrom.

9. The invention of claim 1 wherein:
   the receiving means comprises a pocket in the rear surface of the wall member.

10. The invention of claim 9 wherein:
    the means for supporting the product comprises a floor affixed to the wall member and extending outwardly therefrom.

11. The invention of claim 1 including:
    a rigid tab having an opening therein;
    the tab being placed between the nut and the lower plate such that the bolt will pass through its opening so that upon raising the tab, the nut is raised from the second position to the first position to thereby permit the clamp to be quickly released.

12. A clamp for attachment to a workpiece comprising:

a C-shaped frame having a spine and two spaced apart arms cantilevered from the spine;
one of said arms having a first clamping surface;
the other of said arms having a cavity adjacent the free end thereof, and an upper plate and a lower plate, each of the plates thereof having an opening therein located to permit a bolt to pass therethrough;
the lower plate being canted with respect to the upper plate;
a conventional nut received within the cavity, the nut being of standard size and configuration and including an opening with an unmodified conventional internal helical thread of given standard size and having a given inside diameter;
the opening in the nut being in general alignment with the openings in the plates;
a conventional bolt of standard size and configuration including an unmodified conventional external helical thread of a standard size having an outside diameter no larger than the inside diameter of the nut opening;
the plates of the cavity being shaped so that the nut is movable between a first position against the upper plate and a second position against the lower plate;
in the first position, the nut is normal to the bolt and the bolt passes freely through the nut and in the second position, the nut is canted with respect to the bolt and at least a portion of the thread of the bolt engages at least a portion of the thread of the nut in threaded engagement, whereby the bolt may be moved to obtain a coarse adjustment in the first position of the nut and a fine adjustment in the second position of the nut;
a second clamping surface on the end of the bolt to thereby permit the workpiece to be securely held between the first clamping surface and the second clamping surface.

13. The invention of claim 12 including:
a rigid tab having an opening therein;
the tab being placed between the nut and the lower plate such that the bolt will pass through its opening so that upon raising the tab, the nut is raised from the second position to the first position to thereby permit the clamp to be quickly released.

14. The invention of claim 12 wherein:
the spine is a plate formed to cooperatively engage receiving means associated with a wall member.

15. The invention of claim 14 wherein:
the receiving means comprises a lip projecting from the rear surface so as to form a groove between the lip and the rear surface; and
the plate is shaped to engage the groove.

16. The invention of claim 14 wherein:
the receiving means comprises a pocket in the wall member.

17. The invention of claim 12 including:
means for supporting a product;
a pair of elements engageable with the means for supporting the product and wherein:
the workpiece is a shelf; and
there are a pair of clamps whose spines are integral with the end elements to thereby permit the combination to be assembled and clamped to the shelf to project the product forward of the shelf and to hold it in place with respect thereto.

18. In a clamp for engaging a workpiece having a spine and an arm cantilevered from the spine the improvement comprising:
a cavity adjacent the free end of the arm to receive a conventional nut and having an upper plate and a lower plate, each of the plates having an opening therein located to permit a bolt to pass therethrough;
a conventional nut received within the cavity, the nut being of standard size and configuration and including an opening with an unmodified conventional internal helical thread of given standard size and having a given inside diameter;
the opening in the nut being in general alignment with the openings in the plates;
a conventional bolt of standard size and configuration including an unmodified conventional external helical thread of a standard size having an outside diameter no larger than the inside diameter of the nut opening;
the plates of the cavity being shaped such that the lower plate is canted with respect to the upper plate and so that the nut is movable between a first position against the upper plate and a second position against the lower plate;
in the first position, the nut is normal to the bolt and the bolt passes freely through the nut and in the second position, the nut is canted with respect to the bolt and at least a portion of the thread of the bolt engages at least a portion of the thread of the nut in threaded engagement, whereby the bolt may be moved to obtain a coarse adjustment in the first position of the nut and a fine adjustment in the second position of the nut;
a clamping surface on the end of the bolt for engaging the workpiece.

19. The invention of claim 18 including:
a slot running from one side of each end of the cavity to the opening therein;
the slots being placed to permit access to the openings in the ends from opposed sides of the cavity to thereby permit an assembled nut and bolt to be inserted in the clamp.

20. The invention of claim 18 including:
a rigid tab having an opening therein;
the tab being placed between the nut and the lower plate such that the bolt will pass through its opening so that upon raising the tab, the nut is raised from the second position to the first position to thereby permit the clamp to be quickly released.

21. A shelf extender for holding a product so as to display the same to a purchaser forward of a shelf having two surfaces comprising:
product receiving means having a floor and a back wall;
a pair of end members having receiving means to receive the edges of the product receiving means;
a clamp integral with each of the end members;
said clamp comprising:
a C-shaped frame having a spine and two spaced apart arms cantilevered from the spine;
one of said arms having a first clamping surface;
the other of said arms having a cavity adjacent the free end thereof, and an upper plate and a lower plate, each of the plates thereof having an opening therein located to permit a bolt to pass therethrough;

the lower plate being canted with respect to the upper plate;

a conventional nut received within the cavity, the nut being of standard size and configuration and including an opening with an unmodified conventional internal helical thread of given standard size and having a given inside diameter;

the opening in the nut being in general alignment with the openings in the plates;

a conventional bolt of standard size and configuration including an unmodified conventional external helical thread of a standard size having an outside diameter no larger than the inside diameter of the nut opening;

the plates of the cavity being shaped so that the nut is movable between a first position against the upper plate and a second position wherein it is canted with respect to the first position;

in the first position, the nut is normal to the bolt and the bolt passes freely through the nut and in the second position, the nut is canted with respect to the bolt and at least a portion of the thread of the bolt engages at least a portion of the thread of the nut in threaded engagement, whereby the bolt may be moved to obtain a coarse adjustment in the first position of the nut and a fine adjustment in the second position of the nut;

a second clamping surface on the end of the bolt to thereby permit the workpiece to be securely held between the first clamping surface and the second clamping surface.

22. The invention of claim 21 wherein:

the end members have a body portion with a raised perimeter; and the receiving means comprises at least one rib spaced from the raised perimeter to form a groove therebetween to receive an edge of the product receiving means.

23. The invention of claim 22 including:

a rigid tab having an opening therein;

the tab being placed between the nut and the lower plate such that the bolt will pass through its opening so that upon raising the tab, the nut is raised from the second position to the first position to thereby permit the clamp to be quickly released.

24. The invention of claim 21 including:

a rigid tab having an opening therein;

the tab being placed between the nut and the lower plate such that the bolt will pass through its opening so that upon raising the tab, the nut is raised from the second position to the first position to thereby permit the clamp to be quickly released.

* * * * *